United States Patent [19]
Lothar et al.

[11] Patent Number: 4,783,993
[45] Date of Patent: Nov. 15, 1988

[54] TIRE PRESSURE SENSOR FOR MOTOR VEHICLES

[75] Inventors: Haas Lothar, Stein; Hettich Gerhard, Dietenhofen; Schmid Hans-Dieter, Nürberg, all of Fed. Rep. of Germany

[73] Assignee: Robert Bosch GmbH, Stuttgart, Fed. Rep. of Germany

[21] Appl. No.: 95,536
[22] PCT Filed: Nov. 5, 1986
[86] PCT No.: PCT/DE86/00446
§ 371 Date: Jul. 23, 1987
§ 102(e) Date: Jul. 23, 1987
[87] PCT Pub. No.: WO87/03547
PCT Pub. Date: Jun. 18, 1987

[30] Foreign Application Priority Data
Dec. 12, 1985 [DE] Fed. Rep. of Germany ....... 3543866

[51] Int. Cl.[4] .................. B60C 23/04; G01L 7/08; G01L 9/00
[52] U.S. Cl. .................. 73/146.5; 200/83 N; 340/58
[58] Field of Search ........... 73/146.5, 146.4, 146.3, 73/146.8; 340/58; 200/83 N

[56] References Cited
U.S. PATENT DOCUMENTS
4,071,724  1/1978  LeJeune .................. 340/58
4,701,742 10/1987  Ruehr ................... 73/146.5

FOREIGN PATENT DOCUMENTS
2019651 10/1979 United Kingdom ......... 200/83 N

*Primary Examiner*—Donald O. Woodiel
*Attorney, Agent, or Firm*—Michael J. Striker

[57] ABSTRACT

A tire pressure sensor for motor vehicles comprises a pressure switch which is actuated by the tire pressure for monitoring the tire pressure. The pressure switch has a reference pressure chamber which is closed in the direction of the tire by means of an electrically conducting diaphragm and carries a contact pin which is contacted by the middle area of the diaphragm in order to close an electric circuit when there is sufficient air pressure in the tire. In order to trigger an alarm signal during a leak in the reference pressure chamber a leakage check of the reference pressure chamber is realized in that an air gap is located between the contact pin and the middle area of the diaphragm when there is equal pressure on both sides of the diaphragm.

6 Claims, 1 Drawing Sheet

U.S. Patent
Nov. 15, 1988
4,783,993
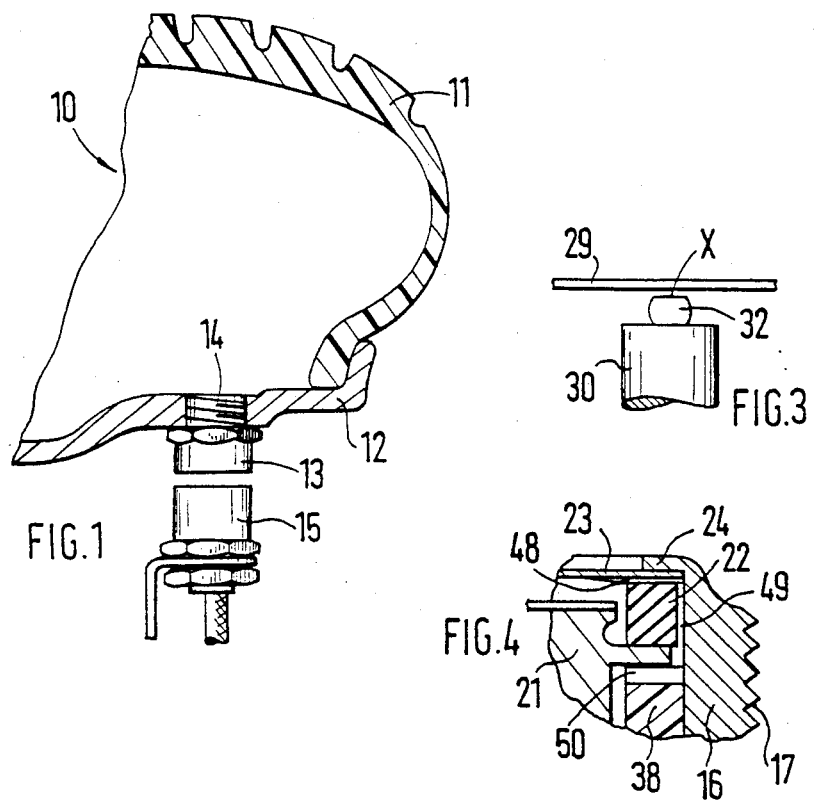
FIG.1
FIG.3
FIG.4
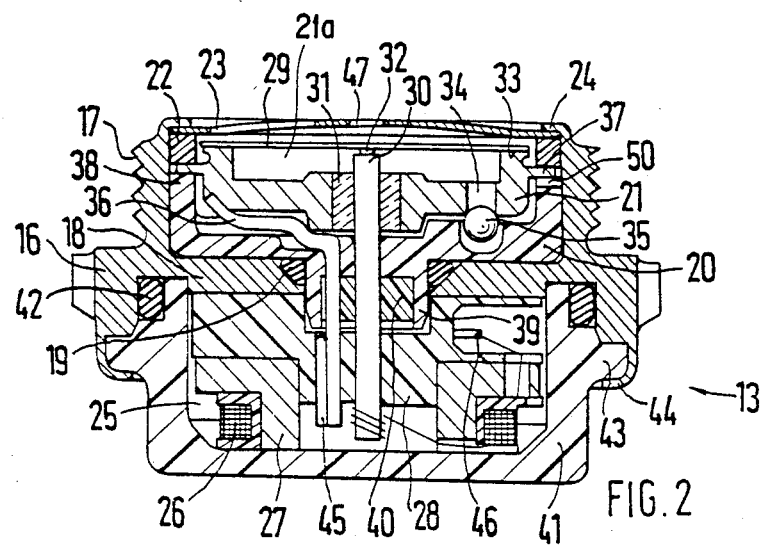
FIG.2

TIRE PRESSURE SENSOR FOR MOTOR VEHICLES

BACKGROUND OF THE INVENTION

The invention relates a tire pressure sensor for motor vehicles. It is known from DE-OS 28 32 447 to screw in a tire pressure sensor at the circumference of a wheel rim, which tire pressure sensor comprises a pressure switch for monitoring the air pressure in the tire and is actuated by the tire pressure. The pressure switch includes, on the one hand, an electrically conducting diaphragm, which closes a reference pressure chamber in the direction of the tire, and, on the other hand, a contact pin which is sealed in a glass bushing so as to be electrically insulated and is contacted by the middle area of the diaphragm when there is sufficient air pressure in the tire in order to close an electric circuit. The reference pressure chamber is filled to a desired reference pressure with air or nitrogen via a duct and is then closed so as to be pressure-sealed. The reference pressure is selected in such a way that the diaphragm contacts the end of the contact pin when there is sufficient air pressure in the tire. On the other hand, if the air pressure in the tire falls below a minimum pressure which is predetermined by means of the reference pressure, the diaphragm rises off the contact pin and opens an oscillating circuit, which comprises a coil and a capacitor, which is arranged in the tire pressure sensor. By means of a high-frequency oscillation of the evaluating circuit, which is arranged so as to be fixed in the vehicle, it can be determined whether or not the pressure switch is closed with a signal receiver arranged in the proximity of the tire when passing the tire pressure sensor with each revolution of the wheel.

In the known constructions of such a tire pressure sensor, it is a disadvantage that a pressure compensation occurs in the reference pressure chamber when there is a leak in the reference pressure chamber, e.g., at the clamping point of the diaphragm, wherein the electric circuit remains closed by the diaphragm so that the information "tire pressure normal" is transmitted by the tire pressure sensor even when the air pressure is too low. A corresponding indication error also occurs if a leak occurs in the reference pressure chamber at the filling duct or at the bushing of the contact pin.

SUMMARY OF THE INVENTION

It is an object of the present invention to provide an improved tire pressure sensor.

The present solution attempts to transmit a signal to the evaluating circuit when a leak occurs in the reference pressure chamber using simple means.

The tire pressure sensor, according to the invention, has the advantage that the diaphragm rises off the contact pin already when there is a pressure compensation between pressure in the reference chamber and the tire pressure and accordingly transmits an alarm signal to the evaluating circuit, i,e, the contact is open in the state of the absence of differential pressure. If the pressure compensation occurs because of a leak, insufficient pressure will be signalized again after a short time when refilling the tire (because of pressure compensation). This does not happen when there is inadequate tire pressure and during refilling.

It is another advantage of this invention that such a leak indication can be used for testing the tightness of the reference pressure chamber already during the production of the tire pressure sensor or before it is shipped or during assembly in a workshop by means of the slight application of compressed air. It is particularly advantageous to fasten the reference pressure chamber in a housing of the reference pressure sensor in such a way that it is completely surrounded by the air pressure in the tire, the housing being screwed into the wheel rim and closed outwardly. In this case, leaks at the filling duct, at the bushing of the contact pin, or in other areas of the reference pressure chamber lead to a pressure compensation with the compressed air in the tire and, accordingly, to an alarm signal. Since the coil and the capacitor of the tire pressure sensor are arranged in an oscillating circuit chamber directed toward the signal receiver, which latter is arranged in the proximity of the wheel so as to be stationary, it is advisable that one end of the contact pin and a connecting wire of the reference pressure chamber project through a seal in the oscillating circuit chamber.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 shows a partial sectional view of a vehicle wheel with the tire pressure sensor, according to the invention, which is inserted in the rim;

FIG. 2 shows a cross section through the tire pressure sensor, according to the invention, in enlarged presentation;

FIG. 3 shows a greatly enlarged switching area of the diaphragm with the contact pin; and FIG. 4 shows the clamping point of the reference chamber at the sensor housing, which clamping point is shown as greatly enlarged.

DETAILED DESCRIPTION OF THE PREFERRED EMBODIMENTS

The part of a motor vehicle wheel in reduced scale is shown in cross section in FIG. 1 and is designated by 10. It shows a tire 11 which is fastened on a wheel rim 12. At an inwardly directed portion of the wheel rim 12, a tire pressure sensor 13 is screwed into a threaded borehole 14 of the wheel rim 12. At a short distance from the latter a signal receiver 15 is fastened in the area of the tire pressure sensor 13 at the wheel suspension of the vehicle, not shown; the front side of the signal receiver 15 is directed toward the tire pressure sensor 13 and excites a high-frequency oscillation in the tire pressure sensor 13 when the latter passes during every revolution of the vehicle wheel 10.

The construction of the tire pressure sensor 13 is shown in FIG. 2. It includes a sensor housing 16 of special steel which has a threaded projection 17 for fastening at the wheel rim 2. The sensor housing 16 is open in the front toward the tire 11. A wide ring shoulder 18 is located in the interior in the middle area of the sensor housing 16. A sealing ring 19, a supporting ring 20 of plastic, a reference pressure chamber forming element of steel, a spacing ring 22 of fiber plastic material, and a perforated covering disk 23 are inserted in the sensor housing 16 and clamped in the sensor housing 16 by means of the ring shoulder 18 and a flange 24 at the front end face of the sensor housing 16. An oscillating circuit chamber 25, in which are arranged a toroidal coil 26, a ferrite core 27, a receiving member 28 of plastic for the ferrite core 27 and a capacitor, which is inserted in the latter but is not shown, is located below the ring shoulder 18 of the sensor housing 16.

The reference pressure chamber 21a formed by element 21 is closed toward the interior of the tire 11 by means of a flat diaphragm 29. In the middle of the reference pressure chamber forming element 21, a contact pin 30 is fastened with a glass bushing 31 so as to be pressure-sealed and is fastened in the reference pressure chamber forming element 21 so as to be electrically insulated. Pin 30, with the contact carries a welded on contact ball 32 of gold at its front end. The contact surface of the contact ball 32 is processed together with the annular supporting surface 33 of the element 21 for the diaphragm 29 in such a way that there is an air gap X of approximately 0.03 mm between the contact ball 32, and the middle area of the diaphragm 29 in order to check leaks in the reference pressure chamber 21a in the pressureless state. FIG. 3 shows this by means of a greatly enlarged view of the contact area between the diaphragm 29 and the contact pin 30. Only then is the diaphragm 29 welded on externally at the front side on the supporting surface 33 so as to be pressure-sealed and free of tension by means of a laser beam. Next, the reference pressure chamber 21a is filled with air or nitrogen with the required reference pressure via a filling duct 34. The filling duct 34 is then closed so as to be pressure-sealed by means of a ball 35 which is pressed in or welded therein. Finally, a connecting wire 36 is welded on at the reference pressure chamber forming element 21 by one end.

The reference pressure chamber forming element 21 is inserted in the supporting ring 20 in such a way that it rests on top of a ring wall 38 of the carrying ring 20 by its radial collar 37 which is formed on at its outer circumference. In the direction of the oscillating circuit chamber 25, the supporting ring 20 has a collar 39 which projects through the ring shoulder 18 of the steel housing 16 and encloses the connecting wire 36 and the contact pin 30. In order to seal the portion of the sensor housing 16 carrying the reference pressure chamber forming element 21 relative to the oscillating circuit chamber 25, the interior of the collar 39 is filled with a sealing substance 40, e.g. a polyurethane, which encloses the contact pin 30 and the connecting wire 36 in the area of the collar 39 so as to be airtight. A covering cap 41 closes the oscillating circuit chamber 35 outwardly in that it rests on the lower end of the sensor housing 16 with an additional sealing ring 42 and is fastened at a ring shoulder 43 by means of a flange 44 of the sensor housing 16. The connecting wire 36 is contacted at its outer end with a connection 45 of the capacitor, not shown, whose other connection 46 is connected with an end of the toroidal coil 26. The other end of the toroidal coil 26 is finally contacted with the free end of the contact pin 30.

In order to ensure a complete leakage testing of the reference pressure chamber 21, the latter must be completely surrounded by the compressed air in the tire. This is achieved in that the compressed air first reaches the diaphragm 29 of the reference pressure chamber 21 through openings 47 in the covering disk 23. As shown in FIG. 4, the compressed air reaches a gap 49 between the steel housing 16 and the spacing ring 22 via a radial notch 48 in the outer area at the underside of the covering disk 23 and, from there, arrives at a radial depression 50 which is worked into the ring wall 38 of the carrying ring 20 and is open toward the collar 37 of the reference pressure chamber 21. From there, the compressed air finally arrives at the rear side of the reference pressure chamber forming element 21. The radial gap 49 between the sensor housing 16 and the spacing ring 22 is formed in that the spacing ring 20, like the collar 37 of the element 21, has a smaller outer diameter than the receptacle of the sensor housing 16 in this area. By means of this step, leaks can be detected at the glass bushing 31, the filling duct 34, and the welding seam of the diaphragm 29 in that they lead to a pressure compensation between the compressed air in the tire at the outside of the diaphragm 29 and the reference pressure at the inside of the diaphragm 29, so that the diaphragm 29 rises from the contact pin 30 and accordingly accommodates the oscillating circuit.

The invention is not limited to the embodiment example, since in many cases a leakage monitoring of the diaphragm welding at the reference pressure chamber is sufficient, and this is already ensured in that the revolving welding seam at the diaphragm is reached by the compressed air in the tire. Also, the contact spacing X between the contact pin and the diaphragm can be effected with a different magnitude and in a different manner, e.g. by means of upsetting the contact ball 32 after welding on the diaphragm 29 prior to filling the reference pressure chamber 21 with gas. It is essential that when the pressure is equal on both sides of the diaphragm 29, the latter rises from the contact pin 30 in order to interrupt the electric circuit.

It will be understood that each of the elements described above, or two or more together, may also find a useful application in other types of tire pressure sensors differing from the types described above.

While the invention has been illustrated and described as embodied in a tire pressure sensor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a tire pressure sensor for motor vehicles, comprising a pressure switch for monitoring tire pressure, said pressure switch being fastened at a circumference of a wheel rim and being actuated by the tire pressure, said pressure switch including a reference pressure chamber; a diaphragm, said reference pressure chamber being closed in the direction of the tire by said diaphragm which is electrically conductive; an element enclosing said reference pressure chamber; a contact pin supported in said element and engageable with a middle area of the diaphragm for closing an electric circuit when there is sufficient air pressure in the tire; the improvement comprising an air gap (X) provided between the contact pin (30) and the middle area of the diaphragm (29) for testing leakage of the reference pressure chamber (21a) when an equal pressure occurs on both sides of the diaphragm (29), the element enclosing the reference pressure chamber being fastened in a sensor housing (16), which is fixed in the wheel rim (12) and closed toward outside, in such a manner that it is surrounded by the compressed air in the tire (11).

2. Tire pressure sensor according to claim 1, wherein said sensor housing is screwed into the wheel rim.

3. Tire pressure sensor according to claim 1, further including a connecting wire (36) connected to said element; an oscillating circuit chamber (25); and an oscillating circuit having a capacitor and a coil (26), , the contact pin (30) and the connecting wire (36) projecting through a seal (40) with one end into the oscillating circuit chamber (25) which receives the capacitor and the coil (26) of the oscillating circuit.

4. Tire pressure sensor according to claim 3, including a supporting ring (20) arranged between the reference pressure chamber and the oscillating circuit chamber (25), said supporting ring (20) including a collar (39) projecting in the direction of the oscillating circuit chamber (25), said collar (39) supporting the connecting wire (36) and the contact pin (30) and being filled with a sealing substance (40).

5. Tire pressure sensor according to claim 4, said supporting ring including an outer ring wall (38), said element having a radial collar (37) which is formed on an outer circumference of said element, is in contact with said ring wall (38) and is clamped with said element (21) by a spacing ring (22) positioned above the collar (37) and with a perforated covering disk (23) by a flange (24) of said housing (16).

6. Tire pressure sensor according to claim 5, wherein for a pressure compensation between a front and a back of the reference pressure chamber, the covering disk (23) has at least one radial notch (48) in an outer area, the spacing ring (22) and the collar (37) of the reference pressure chamber enclosing element (21), having a smaller outer diameter than a receptacle of the sensor housing (16), and the ring wall (38) of the supporting ring (20) having a radial depression (50) which is open toward the collar (37) of the reference pressure chamber enclosing element (21).

* * * * *